United States Patent
Wall et al.

(10) Patent No.: US 7,868,764 B2
(45) Date of Patent: Jan. 11, 2011

(54) CIRCUIT AND METHOD FOR POWER-UP OPTIMIZATION OF RFID TRANSPONDER

(75) Inventors: Bruce Carl Wall, Colorado Springs, CO (US); Dean Allum, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 325 days.

(21) Appl. No.: 12/191,092

(22) Filed: Aug. 13, 2008

(65) Prior Publication Data

US 2010/0039267 A1    Feb. 18, 2010

(51) Int. Cl.
*G08B 13/14* (2006.01)
(52) U.S. Cl. .................................. 340/572.5; 455/123
(58) Field of Classification Search .............. 340/572.5, 340/572.4, 572.2, 10.1; 455/121, 123, 193.1
See application file for complete search history.

(56) References Cited

U.S. PATENT DOCUMENTS

| | | | | |
|---|---|---|---|---|
| 5,491,715 | A * | 2/1996 | Flaxl | 455/123 |
| 6,317,027 | B1 * | 11/2001 | Watkins | 340/10.1 |
| 7,132,946 | B2 | 11/2006 | Waldner et al. | |
| 2009/0102663 | A1 * | 4/2009 | Hillegass | 340/572.5 |
| 2009/0109003 | A1 * | 4/2009 | Tucker et al. | 340/10.1 |
| 2009/0278688 | A1 * | 11/2009 | Tuttle | 340/572.2 |

\* cited by examiner

*Primary Examiner*—John A Tweel, Jr.
(74) *Attorney, Agent, or Firm*—Griffin & Szipl, P.C.

(57) ABSTRACT

The present invention relates to a radio-frequency identification tag (10) and a related method of operation, whereby the tag comprises an antenna (12) being adapted to draw a voltage from an externally applied RF field having a first frequency, and further comprises a tunable antenna resonant circuit (16) comprising a default resonance frequency and having tuning means (18) for shifting the resonance frequency to the first frequency, whereby non-volatile storage means (22) for storing frequency related data are provided, that are accessible at a reduced voltage level, which is below a "power-up" voltage level of the tag's operating unit (14).

16 Claims, 3 Drawing Sheets

CIRCUIT AND METHOD FOR POWER-UP OPTIMIZATION OF RFID TRANSPONDER

FIELD OF THE INVENTION

The present invention relates to a radio-frequency identification (RFID) tag and in particular to a passive RFID power-up mechanism.

BACKGROUND OF THE INVENTION

In order to provide an optimal sensitivity, RFID transponders and RFID tags should have their antenna resonant circuit well tuned to the reader's resonance frequency, in order to achive a maximum power transfer as soon as the transponder or tag enters an area of coverage of the RFID reader. Since passive RFID tags do not have an internal power supply, the electrical power required to activate the tag's integrated circuit has to be entirely drawn from the reader's RF-field.

In order to receive sufficient electrical power, the resonance frequency of an RFID tag's antenna resonant circuit should precisely match the frequency of the reader.

However, manufacturing variability of various low cost resonant circuit components results in a substantial variation of a default resonance frequency from tag to tag.

Also, depending on the specific area of application, the resonance frequency of the RFID tag's antenna resonant circuit may vary, e.g. due to environmental influences. For instance, if RFID tags are used for a product labelling or identification, wherein the RIFD tag is attached to the product or to the product package, the product and product packaging itself will have a non-neglectable influence on the default resonance frequency of the tag's antenna resonant circuit.

Since passive-mode RFID tags must draw their power from the applied RF-field in order to reach a maximum communication distance, these tags should be extremely sensitive and should activate and "power-up" with as low an applied RF-field as possible. An integrated circuit, hence an operating unit being adapted to interact with the RF-field therefore must be "centered" in frequency selection and in its optimum internal bias and operating conditions. However, due to normal manufacturing tolerances or due to a specific tag environment, the antenna resonant circuit of the tag comprises a default resonance frequency, that does not sufficiently match the reader's frequency.

Once the RFID tag has received enough power to activate itself, it is also able to retrieve trim values from a non-volatile memory and to perform a required trim and tuning procedure in order to match its resonance frequency to the reader's frequency. However, in order to perform such a trim or tuning procedure, the tag's operating unit, typically embodied as an integrated circuit, has to activate, which at a given communication distance is not possible as long as the tag's antenna resonant circuit's resonance frequency is offset from the reader's frequency.

Existing solutions either require on-board non-volatile memory in order to install trimmed values for resonance frequency tuning. Alternatively, various frequency scanning systems are suggested, which are adapted to scan some frequency range in order to find the frequency of the RFID reader. However, either method requires that the transponder or tag receives adequate power to access the non-volatile memory and/or to perform logic operations, which in turn are only executable, once the operating unit of the RFID tag has activated or powered-up. Consequently, existing tag architecture requires the resonant circuit to be as close to the reader's frequency prior to application of power.

Document U.S. Pat. No. 7,132,946 B1 discloses radio frequency identification tags that dynamically vary the resonance frequency to reduce or to eliminate the potential effects of electromagnetic "tag-to-tag" coupling. This RFID tag includes a switch being adapted to switch between various inductive elements in order to selectively include inactive elements as additional loops for an antenna. This switch may comprise a low power microelectromechanical system (MEMS) switch, a capacity switch or other switching components. This switch may either be designed to automatically switch between inductive elements, e.g. during a single power up-cycle.

When the RFID tag receives enough power to activate the MEMS switch, the MEMS switch changes position in an attempt to draw enough current/voltage from the RF energy to power an integrated circuit. The MEMS switch may change position after each time RFID tag is powered down. In this manner, the RFID tag would alternate resonating at two different frequencies at every other power-up cycle.

AIM OF THE INVENTION

The present invention therefore aims at providing a passive RFID tag comprising an increased sensitivity to an externally applied RF-field and which comprises an improved and simplified self-trimming mechanism in order to adapt the tag's antenna resonant circuit to a predefined frequency of an externally applied RF-field.

SUMMARY OF THE INVENTION

The invention relates to a radio-frequency identification (RFID) tag pursuant to claim 1 as well as to a method for tuning and self-trimming of a tunable antenna resonant circuit of a RFID-tag pursuant to claim 13. Preferable embodiments of the invention are subject matter of the dependent claims, respectively.

The RFID tag according to the present invention comprises an antenna, which is adapted to draw or to derive a voltage from an externally applied RF-field having a first frequency. The externally applied RF-field at the first frequency represents an RF-field of a reader operating at a well-defined frequency or frequency range. The tag further comprises at least one operating unit for interacting with the RF-field, wherein the operating unit is operable at a power-up or activation voltage level, which is supplied by the antenna and which is drawn or derived from the externally applied RF-field.

The operating unit may comprise an integrated circuit in order to generate or to modify a signal to be transmitted or back scattered to the reader. The operating unit may comprise non-volatile memory, for instance writeable EEPROM for storing tag specific information, e.g. an ID-Number.

However, the operating unit of the RFID tag is not operable and is not able to perform any logical operations as long as the voltage or power level derivable from the externally applied is below the power-up voltage level.

Further, the RFID tag comprises a tunable antenna resonant circuit, which by default operates at a resonance frequency. This resonance frequency may be offset from the first frequency of the externally applied RF-field. The tunable antenna resonant circuit itself comprises tuning means for shifting and trimming its resonance frequency in order to provide a self-trimming mechanism. Such a self-trimming function is intended to lead to a frequency matching between the reader's first frequency and the resonance frequency of the tag's resonant circuit.

The RFID tag according to the present invention is in particular characterized by non-volatile storage means being adapted to store frequency-related data, wherein the data is accessible at a reduced voltage level, below the power-up voltage level of the tag's operating unit. Hence, these non-volatile storage means differ from conventional EEPROM or EPROM non-volatile storage means, in that the stored data is accessible and readable at a voltage or power level being smaller than the voltage or power level required by an integrated circuit to power-up, to access stored data and/or to perform logical operations.

In this way, the invention provides an effective approach to provide a self-trimming mechanism, which is operable already at a reduced voltage or power level compared to the voltage or power level required by the operating unit of the RFID tag in order to perform logic operations. As a consequence, due to the self-trimming mechanism, the tunable antenna resonant circuit can be tuned and frequency shifted to the first frequency of the RF-field, which in turn leads to an increase in the amount of a power or voltage level attainable from the externally applied RF-field. This rise in power of voltage which comes along with the self-trimming procedure performed at the reduced voltage or power level is sufficient to power-up the operating unit and to perform the logical operation for interacting with the RF-field.

According to a first embodiment of the invention, the tuning means of the tunable antenna resonant circuit are adapted to read out the data from the non-volatile storage means in order to modify the resonance frequency in dependence of the retrieved data. The tuning means are therefore adapted to access, to read out and to process the data stored in the non-volatile storage means and finally to modify the resonance frequency of the tunable antenna resonant circuit even at the reduced voltage level. Hence, the tuning means and the non-volatile storage means of the tunable antenna resonant circuit are adapted to autonomously conduct the self-trimming mechanism being operable at the reduced voltage or power level.

According to a further preferred embodiment of the invention, the non-volatile storage means comprise at least one memory cell being electrically coupled to switchable electric elements of the resonant circuit. The switchable electric elements are preferably electrically switchable. By means of switching these electric elements, the resonance frequency of the tunable antenna resonant circuit can be selectively modified. Preferably, the resonance frequency can be stepwise modified by switching one or several of the switchable electric elements, each of which being electrically coupled to at least one memory cell of the non-volatile storage means.

Preferably, the switchable electric elements of the resonant circuit are designed as capacitive, conductive, resistive and/or current or voltage supplying elements. In this way, the self-trimming mechanism can be adapted to various different techniques for trimming the resonant circuit to desirable and required parameter ranges.

For instance, by means of capacitive and/or conductive switchable electric elements, the resonance frequency of the resonant circuit can be trimmed in order to match the first frequency of the externally applied RF-field. Also other tuning or trimming procedures can be implemented in this way, as for instance the so-called power-up threshold tuning or internal bias tuning.

Moreover, in a further embodiment, the non-volatile storage means comprise pairwise coupled memory cells, each of them being electrically coupled to a switchable electric element of the antenna resonant circuit. According to this embodiment, any pair of coupled memory cells is electrically coupled to a distinct switchable electric element of the antenna resonant circuit.

Further, the memory cell may comprise a floating gate transistor. Additionally or alternatively, any pair of coupled memory cells comprises two floating gate transistors, wherein the floating gates of a pair of coupled memory cells are cross-coupled with respect to each other. The pair of cross-coupled non-volatile floating gates provides direct storage and read-out of data, in particular bit information, which in the scope of the present invention may be denoted as "trim bit" of a pair of cross-coupled non-volatile floating gates.

This "trim bit" is typically assigned or associated with a switchable electric element of the resonant circuit, in particular with a capacitor of an array of capacitors. In typical embodiments, the capacitance or inductivity of the tunable antenna resonant circuit is provided by means of an array of capacitive or inductive elements, each of which being assigned or associated with a particular cross-coupled memory cell providing storage means for associated trim bit information.

According to a further embodiment of the invention, the output of a memory cell, in particular of pairwise coupled memory cells is provided to the switchable electric elements of the antenna resonant circuit by means of a Metal Oxide Semiconductor element, in particular an NMOS or PMOS-transistor. This transistor, or more generally, this switch provides a coupling between the memory cell output and the antenna resonant circuit. The PMOS or NMOS transistor can be coupled to another current source or to a current bias trim. Additionally or alternatively, it may add another resistor in a bandgap or oscillator trim.

The operating unit does not necessarily need to be implemented as a digital operating unit. It may also be implemented as an analog electrical unit. In this way, the proposed self-trimming is universally adaptable to digital as well as to analog trim mechanisms, such as operational amplifier gain setting or photo-diode trip level setting and nearly any other conceivable analog trim or self-trim mechanism.

Compared to conventional EEPROM read out processes, the cross-coupled memory cell provides data access and data read-out, hence "trim bit" access at a reduced voltage level, in particular without EEPROM readout. In this way, as soon as the reduced voltage level required for operating the cross coupled memory cell is available, the correct trim value stored in the coupled memory cells can be attained and the antenna resonant circuit is immediately tunable to the resonant frequency as specified by the stored data. This entire self-trimming procedure can be executed at a power or voltage level, at which the operating unit or the integrated circuit of the RFID has not yet powered-up. In this way, an EEPROM readout can be circumvented.

Furthermore, the input of the memory cell is coupled to a voltage shifting unit providing a voltage supply suitable for programming the memory cell. In typical embodiments, storage and programming of the memory cell is performed during an initial calibrating or initializing of an RFID-tag or its components for the final application. Hence, the data to be stored in the non-volatile storage means contains information related to the first frequency of the externally applied RF-field and/or this data is related to tag specific frequency offset, which might be due to designated application of the tag and which may be influenced by the tag environment.

The level of the reduced voltage or power level at which the self-trimming mechanism becomes able to operate is governed by the threshold voltage of the underlying process technology. For instance, the reduced voltage level may be between 0.5 and 0.8 Volt, preferable around 0.6 Volt. In any case, the reduced voltage level is significantly lower than the voltage level required for power-up of the RFID-tag's operating unit. Typically, such operating units making use of integrated circuits including EEPROM storage means require a voltage level of at least around 1.0 Volt in order to operate properly.

In another independent aspect, the invention provides a method for tuning a tunable antenna resonant circuit of a radio-frequency identification tag. The tag comprises at least an antenna being adapted to draw or to derive a voltage from an externally applied RF-field having a first frequency. The tag further comprises at least one operating unit for interacting with the RF-field, whereby the operating unit is operable above a power-up voltage level supplied by the antenna, as soon as the RFID-tag is disposed close enough to the location of the RF-field transmitting reader.

The method for tuning the tunable antenna resonant circuit comprises the steps of storing or programming frequency related data in non-volatile storage means of the tag for accessing and for read out the stored data from the non-volatile storage means at a reduced voltage level compared to the power up-voltage level of the operating unit.

Finally by retrieving the frequency related data from the non-volatile storage means, the resonance frequency of the antenna resonant circuit is tuned or adapted to the first frequency of the externally applied RF-field in order to provide a frequency match. After this self-trimming procedure has been performed at the reduced voltage level, which is typically conducted below 1.0 Volt, the RFID-tag and its resonant circuit is able to draw an increased amount of power from the externally applied RF-field, thus allowing to power-up the RFID-tag's operating unit in order to interact with the external RF-field.

The data to be stored in the non-volatile storage means contains information at least on the first and predefined frequency of the externally applied RF-field. Furthermore, the data to be stored in the non-volatile storage can also be indicative of tag related frequency offset information. This tag specific frequency offset may depend on the final application and/or the tag environment.

Furthermore, it is intended, that the data storage is executed at the power-up voltage level during an initialization procedure of the tag. In this way, a tag supplier or a facility being responsible for calibrating or initializing the transponder or its component for the final application may selectively and individually modify the tag for a distinct purpose. The programming or storage mode of the RFID-tag may be activated without application of an RF-field. In these cases, the power required for storage and programming can be provided by means of some rectifier circuit, in particular a respective bridge or charge pump. The programming power can also be supplied from an external source.

BRIEF DESCRIPTION OF THE DRAWINGS

Various embodiments of the present invention are described in the following by making reference to the drawings in which.

DETAILED DESCRIPTION OF THE ILLUSTRATIVE EMBODIMENTS

Figure 1:
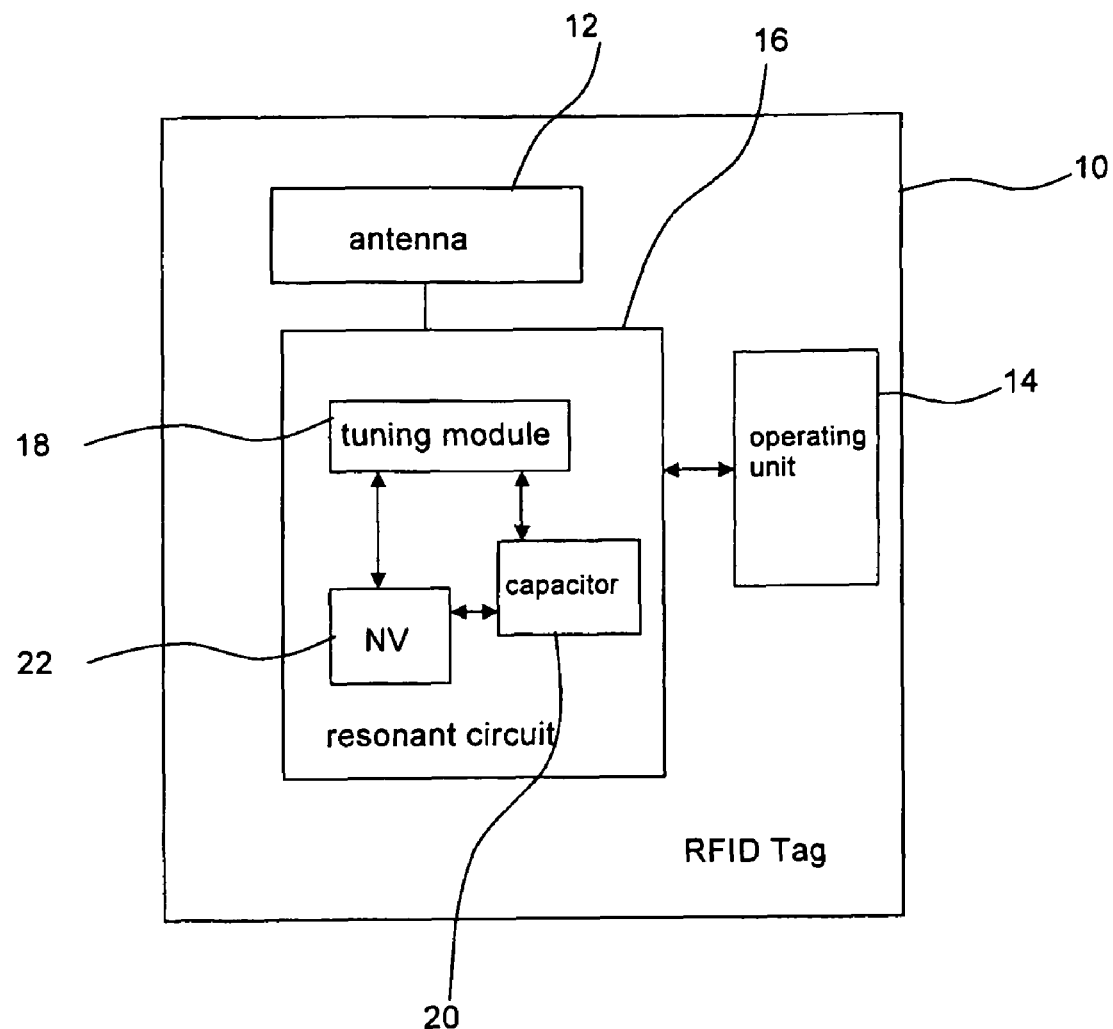
FIG. 1 schematically illustrates an RFID-tag by means of a block diagram.

FIG. 1 schematically illustrates an RFID-tag or RFID-transponder 10, comprising an antenna 12 being electrically coupled to an antenna resonant circuit 16, which is tunable to a resonance frequency within a certain range of a default frequency. The resonant circuit 16 and the antenna 12 provide a power supply for an operating unit 14, which is implemented as an integrated circuit. The operating unit 14 is adapted to modify and/or to back-scatter a carrier wave being receivable from an externally applied RF-field, which is not explicitly illustrated in the figures.

Hence, the operating unit 14 is adapted to provide a response to the externally applied RF-field. In particular, the operating unit 14 is adapted to provide an ID-number or other tag-related codes or information to the reader. For instance, the operating unit 14 may comprise non-volatile memory, such as writable EEPROM for storing tag-relevant information or data.

The integrated circuit of the operating unit 14 requires a certain voltage or power level to be derived from the external applied RF-field by means of the antenna 12 and the attached antenna resonant circuit 16. Typical voltage levels are around 1.0 Volt. However, since the passive RFID-tag 10 draws all of its electrical power from the externally applied RF-field, the antenna 12 and the associated antenna resonant circuit 16 should comprise a resonance frequency that matches the frequency of the externally applied RF-field.

The antenna resonant circuit 16 comprises tuning means 18 as well as capacitive elements 20 and associated non-volatile storage means 22. These components, the tuning means 18, the switchable capacitive elements 20 as well as the non-volatile storage 22 are operable at a reduced power-up voltage level compared to the power-up voltage level of the operating unit 14. The non-volatile storage means 22 comprise data- or frequency-related information of the externally applied RF-field. As soon as the voltage derived by the antenna exceeds the reduced power or voltage level required by the self-trimming resonant circuit 16, a self-trimming procedure is executed before the operating unit 14 becomes operable. In this way, the sensitivity and range of an RFID-tag can be considerably enhanced.

As soon as the resonant circuit 16 and its components 18, 20, 22 have executed the self-trimming procedure, the antenna 12 and the resonant circuit 16 are driven at a resonance frequency which ideally matches the frequency of the externally applied RF-field. As soon as the resonance frequency of the antenna 12 and attached resonant circuit 16 matches the frequency of the externally applied RF-field, the attainable voltage or power level increases and reaches a level in the vicinity of the power-up level of the operating unit 14. Consequently, the operating unit powers up and performs the intended communication and interaction with the RF-field.

Figure 2:
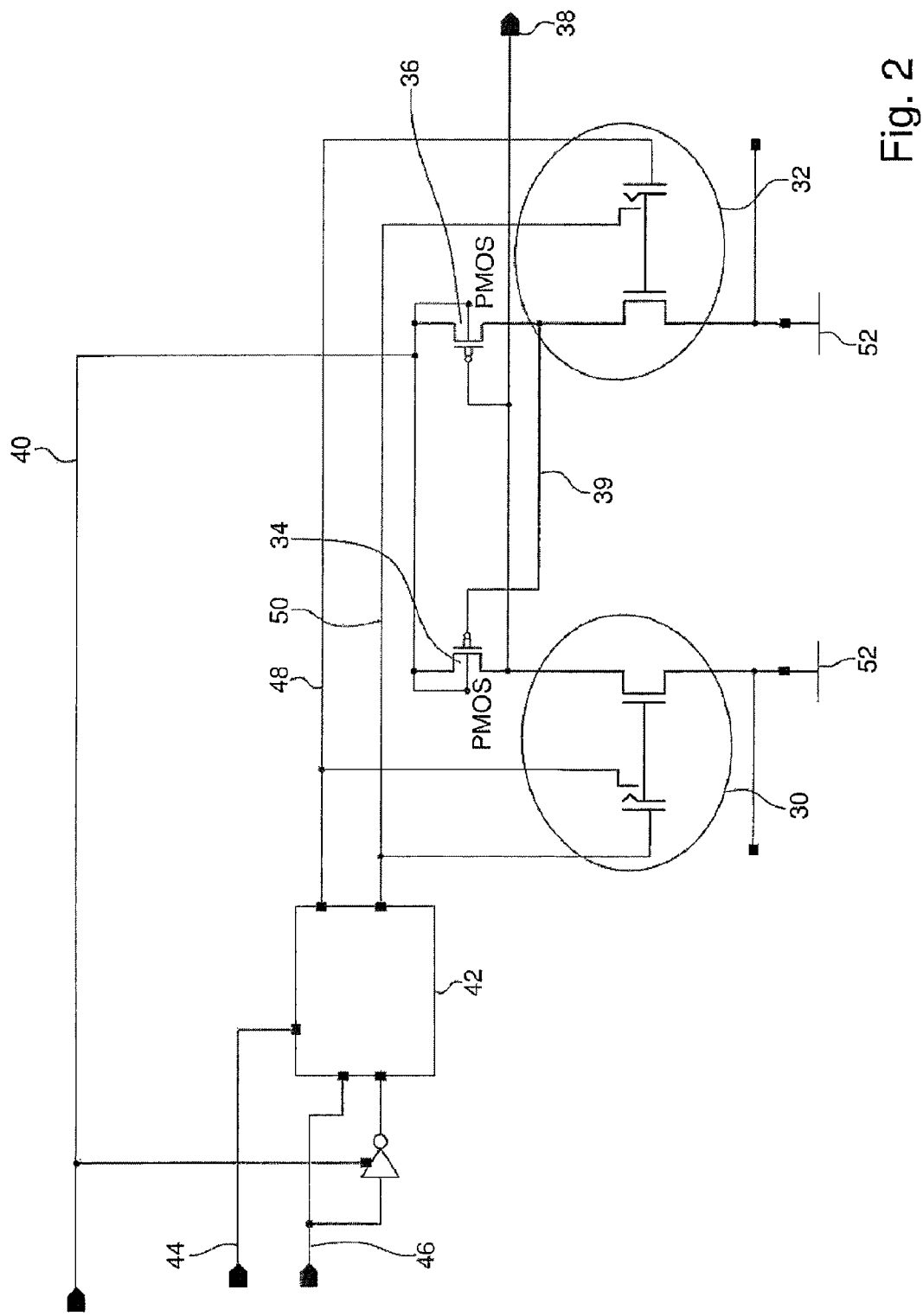
FIG. 2 illustrates any detailed circuit diagram of the non-volatile storage, and FIG. 3 gives a flow chart diagram representing the method on how to perform the self-trimming mechanism.

FIG. 2 illustrates a detailed circuit diagram of the resonant circuit 16. The resonant circuit comprises two cross-coupled memory cells, each of which comprising a floating gate transistor 30, 32 and an associated PMOS-transistor 34, 36.

For the cross-coupling of the two memory cells, the drain of floating gate 30 is coupled to a gate of PMOS 36 and to the source of PMOS 34. The drain of floating gate 32 is coupled to the gate of PMOS 34 and to the drain of PMOS 36. Further, a control gate of the floating gate 30 is coupled to a second output 50 of a level shifting unit 42. A first output 48 of the level shifter 42 is coupled to the control gate of floating gate 32. The drain of floating gate 30 is coupled to the output 38, whereby a complementary signal can be obtained at drain 39 of floating gate 32. Drains of PMOS 34 and PMOS 36 are both coupled to a DC power supply of the circuit 40.

The two input lines 44 and 46 are connected to the level shifter 42 for programming the memory cells. In a programming procedure, a voltage on input 46, either selecting a logical "1" or a logical "0" is provided. Further a DC voltage is applied on power supply input line 40. The signal provided on input line 46 is the digital control signal to select the state of the cell after a higher voltage HV required for programming the cell is provided on input line 44.

The DC power provided on line 40 is typically provided by some kind of external source during programming or during factory trim of the capacitor array, which is not explicitly illustrated in FIG. 2. During normal operation, the DC power provided by line 40 is derived from the externally applied RF-field.

The logical table of the programming cell reads as follows.

| Input 46 | Cell 30 | Cell 32 | Output 38 |
|----------|---------|---------|-----------|
| 1        | OFF     | ON      | 1         |
| 0        | ON      | OFF     | 0         |

Additionally, the logical table of the level shifter has the following structure.

| Input 44 | Input 46 | Output 48 | Output 50 |
|----------|----------|-----------|-----------|
| HV       | 1        | 0         | HV        |
| HV       | 0        | HV        | 0         |
| 0        | x        | 0         | 0         |

The two floating gates 30, 32 actually contain the stored data, in particular the data and the data complement. This data can only be changed by application of a voltage HV via output lines 48, 50. As soon as a reduced voltage level is supplied via the line 40, the memory cells 30, 32 provide their stored status. If a cell is turned "off", its drain is pulled up via PMOS 34 or PMOS 36 towards the line 40. Otherwise, if switched "on", the cell's drain "D" will be pulled down to VSS 52, provided that the required reduced voltage level is applied via line 40.

The output of a memory cell 38 is tied to the gate of a series control switch of a subsequent capacitor. The cap would have one side connected to the antenna input and the other side to the series control switch. If the output equals logical 1, then the cap would be added into the path between antenna and antenna return.

The coupling between the output 38 and an array of capacities is typically provided by some kind of PMOS or NMOS transistor. Hence, the output 38 may be connected to the gate of an NMOS in series with an associated capacitor. Further, one cross-coupled cell 32, 34 is required for each capacitor to be trimmed by the self-trimmed mechanism according to the present invention.

Figure 3:
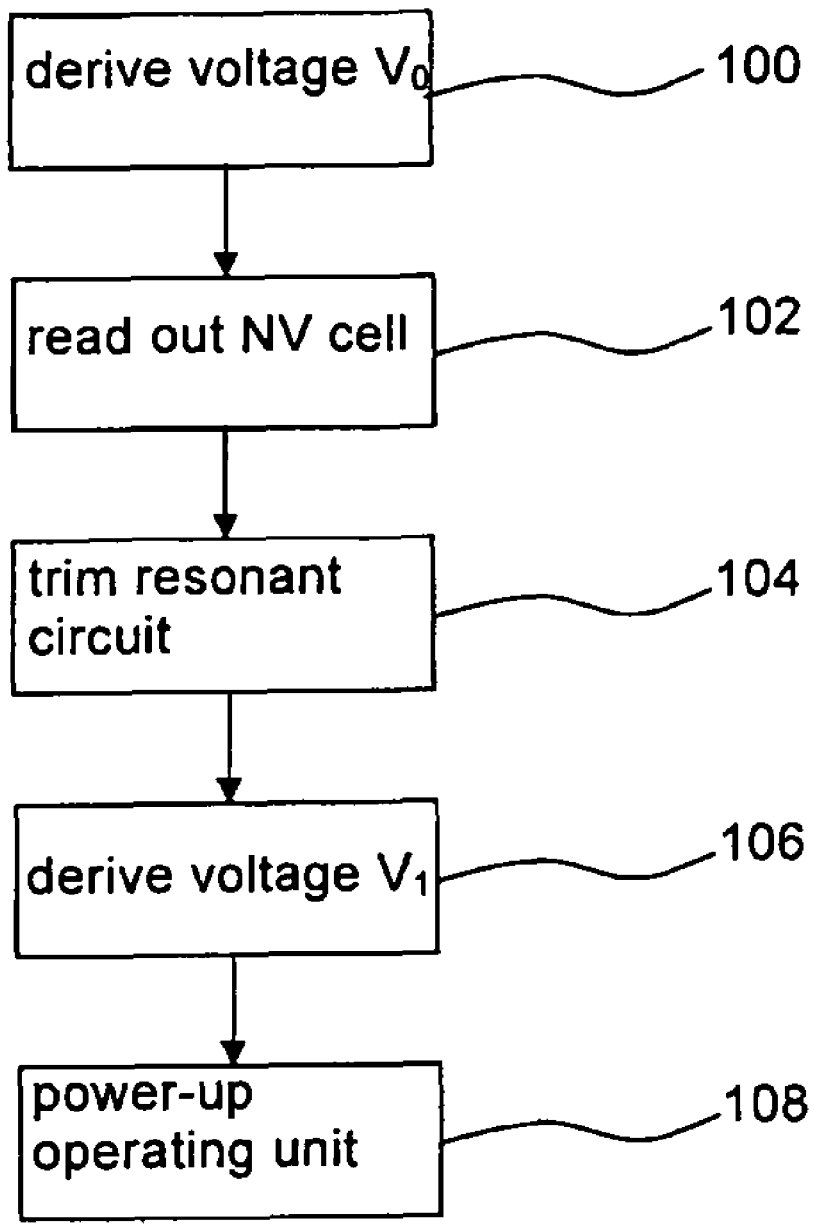

FIG. 3 finally sketches the self-trimming mechanism. First of all, at step 100, a voltage, for instance $V_0$ is derived from an externally applied RF-field by making use of a default resonance frequency $v_0$ of the resonant circuit. This voltage level $V_0$ is lower than the voltage level $V_1$, at which the operating unit of the RFID-tag powers-up. However, at this reduced voltage level $V_0$, the content of the non-volatile memory cells becomes accessible and the stored bit information is read out in step 102. Also, in subsequent step 104, the data retrieved from the non-volatile memory cell is used to trim the resonant circuit and to switch capacitive or inductive elements of the antenna resonant circuit in order to shift its resonance frequency to a frequency being associated to the stored data.

In this way, the resonance frequency of the antenna resonant circuit can be shifted from $f_0$ to $f_0 + \Delta f$. As soon as the resonant circuit is tuned to a shifted resonance frequency, matching the frequency of the externally applied RF-field, in step 106 an increased voltage $V_1$ can be derived and drawn from the externally applied RF-field. Finally, in step 108, the operating unit of the RF-tag is able to activate and to "power-up" in order to interact with the RF-field.

While particular embodiments of the present invention have been illustrated and described, it would be obvious to those skilled in the art, that various other changes and modifications can be made without departing from the spirit and scope of the invention. It is therefore intended to cover in the appended claims all such changes and modifications that are within the scope of this invention.

| List of Reference Numerals | |
|----|----|
| 10 | RFID-tag |
| 12 | antenna |
| 14 | operating unit |
| 16 | antenna resonant circuit |
| 18 | tuning module |
| 20 | capacitor |
| 22 | non-volatile memory |
| 30 | floating gate |
| 32 | floating gate |
| 34 | PMOS |
| 36 | PMOS |
| 38 | output |
| 40 | DC power supply |
| 42 | level shifter |
| 44 | high voltage input |
| 46 | input |
| 48 | output |
| 50 | output |
| 52 | VSS |

What is claimed is:

1. A radio-frequency identification tag comprising:
    an antenna being adapted to draw a voltage from an externally applied RF field having a first frequency,
    at least one operating unit for interacting with the RF field, the operating unit being operable above a power-up voltage level supplied by the antenna,
    a tunable antenna resonant circuit with a resonance frequency having a default value and comprising tuning means for shifting the resonance frequency to the first frequency, characterized by
    non-volatile storage means for storing frequency related data, wherein the data is accessible at a reduced voltage level being smaller than the power-up voltage level of the operating unit.

2. The tag according to claim 1, wherein the tuning means is adapted to read out the data for modifying the resonance frequency in dependence of the retrieved data.

3. The tag according to claim 1, wherein the non-volatile storage means comprises at least one memory cell being electrically coupled to switchable electric elements of the resonant circuit.

4. The tag according to claim 3, wherein the switchable electric elements of the resonant circuit is designed as a capacitive, conductive, resistive and/or current or voltage supplying elements.

5. The tag according to claim 3, wherein the non-volatile storage means comprises pairwise coupled memory cells, each of which being electrically coupled to the switchable electric elements of the antenna resonant circuit.

6. The tag according to claim 3, wherein each memory cell comprises a floating gate transistor.

7. The tag according to claim 6, wherein the floating gate transistors are cross coupled with respect to each other.

8. The tag according to claim 3, wherein an output of the memory cell is coupled to the switchable electric elements of the antenna resonant circuit by means of a Metal Oxide Semiconductor element.

9. The tag according to claim 1, wherein the operating unit is implemented as an analog electrical unit.

10. The tag according to claim 3, wherein an input of the memory cell is coupled to a voltage shifting unit providing a voltage supply suitable for programming or for storing data into the memory cell.

11. The tag according to claim 3, wherein the memory cell is adapted to store the data as trim bit being assigned to a capacitance of a capacitive element of the antenna resonant circuit.

12. The tag according to claim 1, wherein the data stored in the non-volatile storage means contains information related to the first frequency and/or to tag specific frequency offset.

13. A method for tuning a tunable antenna resonant circuit of a radio-frequency identification tag comprising an antenna being adapted to draw a voltage from an externally applied RF field having a first frequency and further comprising at least one operating unit for interacting with the RF field, the operating unit being operable above a power-up voltage level supplied by the antenna, the method comprising the steps of:
   storing of frequency related data in non-volatile storage means of the tag,
   accessing the stored data from the non-volatile storage means at a reduced voltage level being smaller than the power-up voltage level of the operating unit,
   tuning the antenna resonant circuit to the first frequency by means of the retrieved data at the reduced voltage level.

14. The method according to claim 13, wherein the data to be stored in the non-volatile storage means contains information on the first frequency and on tag-related frequency offset.

15. The method according to claim 13, wherein storing of the data is executed at or above the power-up voltage level during an initialization procedure of the tag.

16. A radio-frequency identification tag comprising:
   an antenna being adapted to draw a voltage from an externally applied RF field having a first frequency;
   at least one operating unit for interacting with the RF field, the operating unit being operable above a power-up voltage level supplied by the antenna;
   a tunable antenna resonant circuit comprising a default resonance frequency and comprising tuning means for shifting the resonance frequency to the first frequency, characterized by, non-volatile storage means for storing frequency related data, wherein the data is accessible at a reduced voltage level being smaller than the power-up voltage level of the operating unit;
   wherein the tuning means is adapted to read out the data for modifying the resonance frequency in dependence of the retrieved data;
   wherein the non-volatile storage means comprises at least one memory cell being electrically coupled to a switchable electric element of the resonant circuit;
   wherein the non-volatile storage means comprises pairwise coupled memory cells, each of which is electrically coupled to a switchable electric element of the antenna resonant circuit;
   wherein the memory cell comprises a floating gate transistor;
   wherein the floating gate transistors are cross coupled with respect to each other;
   wherein an output of the memory cell is coupled to the switchable electric elements of the antenna resonant circuit by means of a Metal Oxide Semiconductor element;
   wherein the operating unit is implemented as an analog electrical unit;
   wherein an input of the memory cell is coupled to a voltage shifting unit providing a voltage supply suitable for programming or for storing data into the memory cell;
   wherein the memory cell is adapted to store the data as trim bit being assigned to a capacitance of a capacitive element of the antenna resonant circuit.; and
   wherein the data stored in the non-volatile storage means contains information related to the first frequency and/or to tag specific frequency offset.

* * * * *